(12) United States Patent  
Mergard

(10) Patent No.: US 8,613,262 B1
(45) Date of Patent: Dec. 24, 2013

(54) ALL-IN ONE DOG COLLAR SYSTEM

(71) Applicant: Michael Mergard, Bensalem, PA (US)

(72) Inventor: Michael Mergard, Bensalem, PA (US)

(*) Notice: Subject to any disclaimer, the term of this patent is extended or adjusted under 35 U.S.C. 154(b) by 2 days.

(21) Appl. No.: 13/652,432

(22) Filed: Oct. 15, 2012

Related U.S. Application Data

(60) Provisional application No. 61/549,834, filed on Oct. 21, 2011.

(51) Int. Cl.
*A01K 27/00* (2006.01)

(52) U.S. Cl.
USPC ............................................. 119/858; 119/72

(58) Field of Classification Search
USPC ......... 119/794, 796, 795, 797, 798, 856, 863, 119/792, 858, 61.5, 72, 61.56, 51.01
See application file for complete search history.

(56) References Cited

U.S. PATENT DOCUMENTS

| | | | | |
|---|---|---|---|---|
| 3,542,263 | A * | 11/1970 | Callahan | 224/199 |
| 4,907,729 | A * | 3/1990 | Hess, III | 224/682 |
| 5,233,942 | A * | 8/1993 | Cooper et al. | 119/792 |
| 5,363,809 | A * | 11/1994 | Roe | 119/792 |
| 6,016,772 | A | 1/2000 | Noyes | |
| 6,481,382 | B2 * | 11/2002 | Cohn | 119/794 |
| 6,516,748 | B1 | 2/2003 | Jackson | |
| 6,581,547 | B1 * | 6/2003 | Austin | 119/794 |
| 8,336,504 | B1 * | 12/2012 | Geis | 119/794 |
| 2002/0066413 | A1 | 6/2002 | Prezant | |
| 2004/0154556 | A1 * | 8/2004 | Masterson et al. | 119/794 |
| 2006/0137625 | A1 * | 6/2006 | Conte | 119/858 |
| 2007/0163507 | A1 * | 7/2007 | Lynch | 119/61.56 |
| 2008/0163830 | A1 * | 7/2008 | Dagnon | 119/794 |
| 2009/0199776 | A1 | 8/2009 | Alexander et al. | |
| 2010/0018468 | A1 | 1/2010 | Rabello | |
| 2010/0024741 | A1 * | 2/2010 | Schoppman | 119/795 |
| 2010/0050949 | A1 * | 3/2010 | Hsieh | 119/61.56 |
| 2010/0251970 | A1 | 10/2010 | Dagnon | |
| 2011/0023794 | A1 * | 2/2011 | Smith | 119/794 |
| 2011/0174238 | A1 * | 7/2011 | Dagnon | 119/794 |

* cited by examiner

*Primary Examiner* — T. Nguyen
(74) *Attorney, Agent, or Firm* — RG Patent Consulting, LLC; Rachel Gilboy

(57) ABSTRACT

An animal collar system has an animal collar including, a fabric pouch; a flexible plastic collapsible bowl removably housed in the fabric pouch; a plastic circular-shaped housing unit located on the animal collar; and a loop. The animal collar system is useful for controlling relative movement of the animal in relation to a walker and also is able to provide a convenient collapsible bowl, usable when desired, allowing the walker to provide the animal with at least one refreshing liquid in a remote location. The fabric pouch is coupled to the animal collar. The collapsible bowl is foldable into the fabric pouch when in a non-use condition. Further, the collapsible bowl has an interior volume when in an in-use condition for temporarily storing water for the animal.

12 Claims, 6 Drawing Sheets

ALL-IN ONE DOG COLLAR SYSTEM

CROSS-REFERENCE TO RELATED APPLICATION

The present application is related to and claims priority from prior provisional application Ser. No. 61/549,834, filed Oct. 21, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of animal collars and more specifically relates to an animal collar comprising a small built-in retractable leash and a small collapsible bowl stored in a pouch located on the animal collar.

An animal collar is a device that attaches to the neck of an animal to allow it to be harnessed, tied up, or for various other reasons. The animal collar comprises a piece of material put around the neck of certain pet animals, such as dogs or cats, for control, identification, or other purposes. Identification tags and medical information is often placed on collars. Collars are also useful for controlling the animal, as they provide a handle for grabbing or means of leading. Pet collars can be made of leather, nylon or metal. Metal collars are normally used for larger and dangerous dogs. They can come with traditional or quick-release buckles. Collars are sometimes used for fashion purposes.

When dog owners take their animals outside, they typically like to be able to provide the dog with water throughout their journey. It's easy to forget to bring a bowl, and even when an owner remembers, it can be cumbersome to hold onto a bowl, a leash and any personal belongings simultaneously. If no receptacle is available, the owner may try to pour water from a water bottle into the dog's mouth, or allow it to drink from a hose. However, both of these options waste water and the dog may not get properly hydrated. Some owners may opt to buy a new receptacle while out on a walk, but that option may become expensive. A more efficient solution is necessary.

Various attempts have been made to solve the above-mentioned problems such as those found in U.S. Pat. And U.S. Publication Nos. 2002/0066413; U.S. Pat. No. 6,516,748; 2009/0199776; U.S. Pat. No. 6,016,772; 2010/0251970; and 2010/0018468. This art is representative of multi-functional animal collars. None of the above inventions and patents, taken either singly or in combination, is seen to describe the invention as claimed.

Ideally, an animal collar system should be comfortable, safe, absorbent, secure, stylish and, yet would operate reliably and be manufactured at a modest expense. Thus, a need exists for a reliable animal collar system comprising a small built-in retractable leash and a small collapsible bowl stored in a pouch located on the animal collar and to avoid the above-mentioned problems.

BRIEF SUMMARY OF THE INVENTION

In view of the foregoing disadvantages inherent in the known animal collar art, the present invention provides a novel animal collar system. The general purpose of the present invention, which will be described subsequently in greater detail, is to provide an animal collar system comprising a small built-in retractable leash and a small collapsible bowl stored in a pouch located on the animal collar. The collapsible bowl is removable separate and apart from the collar so that the animal may still be maintained under control.

An animal collar system is disclosed herein comprising an animal collar including a fabric pouch having a button clasp fastener; a flexible plastic collapsible bowl removably housed in the fabric pouch; a plastic circular-shaped housing unit located on the animal collar; and a loop located on the animal collar wherein a walker of an animal may temporarily place identification tags of the animal. The animal collar system is useful for controlling relative movement of the animal in relation to the walker and also is able to provide a convenient collapsible bowl, usable when desired, allowing the walker to provide the animal with at least one refreshing liquid in a remote location, yet still able to control the animal since the collar still remains around the animal's neck. The fabric pouch is coupled to the animal collar.

The collapsible bowl is foldable into the fabric pouch when in a non-use condition. Further, the collapsible bowl comprises an interior volume when in an in-use condition. The interior volume of the collapsible bowl is used to temporarily store the liquid, the liquid comprising water for the animal. The collapsible bowl is un-folded when removed from the fabric pouch prior to use and expands thereby exposing the interior volume for the in-use condition.

The collapsible bowl may further comprise a plurality of wires. The plurality of wires, if present, are preferably located vertically downward from a top portion of the collapsible bowl to a bottom portion of the collapsible bowl. The wires run along the bottom portion of the collapsible bowl to provide structural support for the collapsible bowl when in the in-use condition. The wires structurally maintain the collapsible bowl uprightly when the interior volume is exposed and the collapsible bowl is in the in-use condition; and allows it to collapse when the use is finished and storage is desired.

The circular housing unit stores a retractable animal leash for use when walking an animal (so there is no need to carry on his/her person). The retractable leash is coilable inside the circular plastic housing unit and is retractably-extendable to an approximate length of 8 to 10 feet when walking the animal. The retractable leash, when switching from walking the animal to the animal resting, is spring-retractable back into the circular housing unit. The retractable leash preferably further comprises at least one circular ring located on an end of the circular housing unit dimensioned to fit one to two fingers of the walker inside to grasp said retractable leash.

A kit is also embodied herein for the animal collar system comprising: a plurality of animal collars in various sizes and materials; a plurality of collapsible bowls; and a set of user instructions.

A method of use for an animal collar system comprises the steps of: inserting an animal collar onto a neck of an animal; grasping a ring located on an end of a retractable animal leash; extending a retractable leash out of a circular-shaped housing unit; walking the animal; opening up a fabric pouch; removing a collapsible bowl; expanding the collapsible bowl; inserting water into the collapsible bowl for the animal to drink; collapsing the collapsible bowl; and inserting the collapsible bowl back into the fabric pouch when the animal is finished drinking the water.

The present invention holds significant improvements and serves as an animal collar system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention animal collar system, constructed and operative according to the teachings of the present invention.

DETAILED DESCRIPTION

As discussed above, embodiments of the present invention relate to an animal collar and more specifically relates to an animal collar comprising a small built-in retractable leash and a small collapsible bowl, the bowl storable in a pouch located on the animal collar.

Generally speaking, the All-In-One Dog Collar (animal collar system) is a device that makes venturing outdoors with a dog more convenient for the animal's owner. The invention may resemble a conventional collar with a housing unit on top for a retractable leash, and a fabric pouch with a button clasp on the side that may contain a small, collapsible, flexible plastic bowl. The bowl may unroll and expand so it may stand up on its own and hold water. The bowl may be folded and returned to the pouch when not in use. The collar may include a loop where an owner may place the dog's tags. The leash may be coiled inside a circular plastic housing and may be accessed with a circular handle big enough for one or two fingers to grasp it. The leash may extend 8' to 10'. When the leash is no longer needed, it may retract back into the housing unit.

Figure 1:
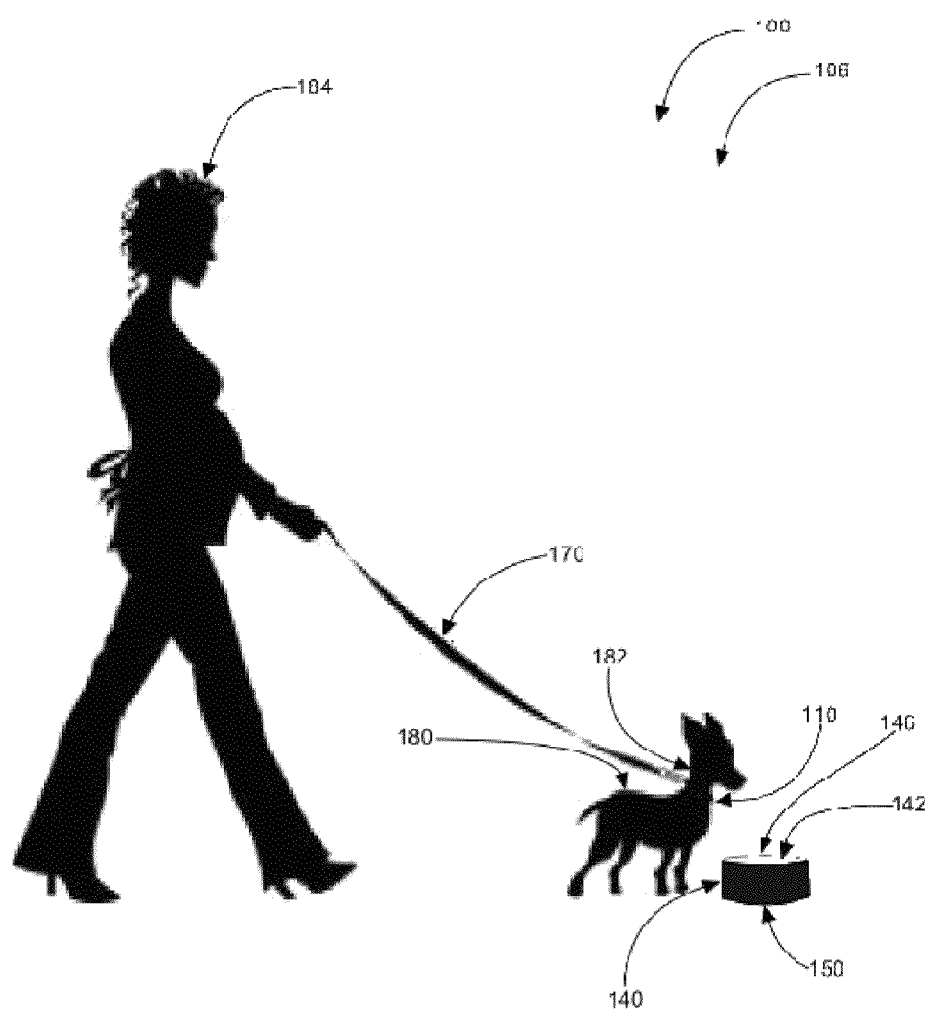
FIG. 1 shows a perspective view illustrating an animal collar system in an in-use condition according to an embodiment of the present invention.

Referring to the drawings by numerals of reference there is shown in FIG. 1, a perspective view illustrating animal collar system 100 in in-use condition 106 according to an embodiment of the present invention.

Animal collar system 110 preferably comprises: animal collar 110 including fabric pouch 120; collapsible bowl 140 removably housed in fabric pouch 120; and circular-shaped housing unit 160 preferably located on animal collar 110. Fabric pouch 120 is preferably coupled to animal collar 110. Circular housing unit 160 preferably stores retractable animal leash 170 for use when walking animal 180. Animal collar system 100 is useful for controlling relative movement of animal 180 in relation to walker 184 and also able to provide a convenient collapsible bowl 140, usable when desired, allowing walker 184 to provide animal 180 with at least one refreshing liquid in a remote location, yet still able to control animal 180.

Figure 2A:
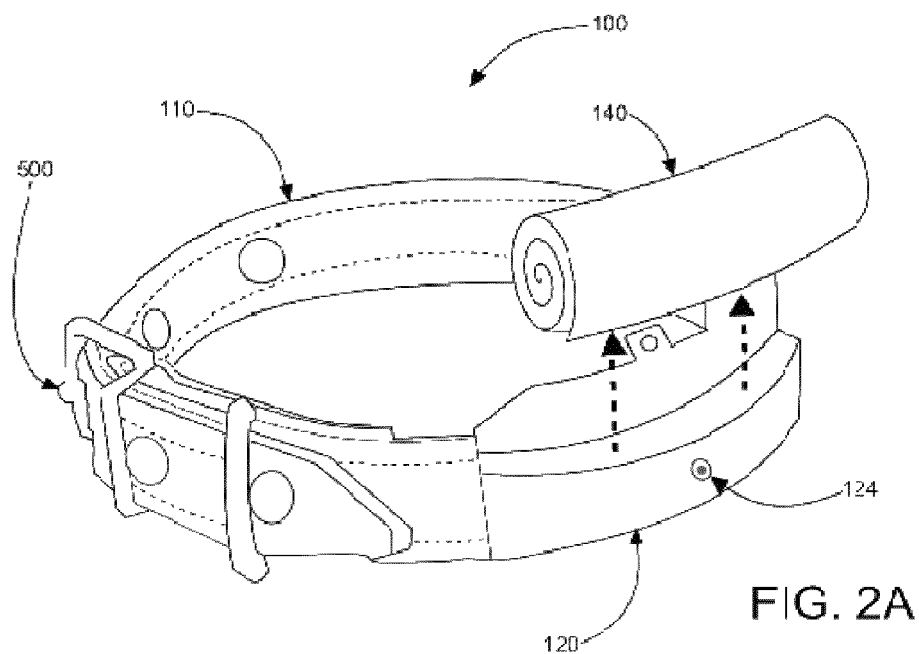
FIG. 2A is a perspective view illustrating a collapsible bowl as removably-housable in a fabric pouch of the animal collar system according to an embodiment of the present invention of FIG. 1.

Referring now to FIG. 2A showing a perspective view illustrating collapsible bowl 140 removably-housed in fabric pouch 120 of animal collar system 100 according to an embodiment of the present invention of FIG. 1.

Collapsible bowl 140 is preferably foldable into fabric pouch 120 when in non-use condition 200 as shown in FIG. 2. Upon reading this specification, it should be appreciated that, under appropriate circumstances, considering such issues as user preferences, design preference, structural requirements, marketing preferences, cost, available materials, technological advances, etc., other material arrangements such as, for example, canvas, nylon, leather, or other suitably equivalent material not damaged by water, but able to hold water, etc., may be sufficient.

Figure 2B:
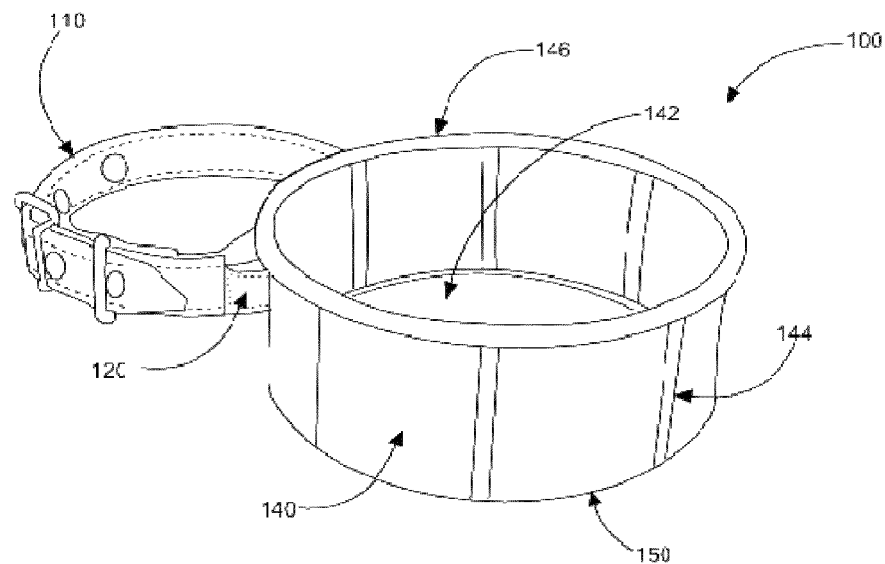
FIG. 2B is a perspective view illustrating the collapsible bowl un-folded when removed from the fabric pouch prior to use according to an embodiment of the present invention of FIG. 1.

Referring now to FIG. 2B showing a perspective view illustrating collapsible bowl 140 un-folded when removed from fabric pouch 120 of animal collar system 100 according to an embodiment of the present invention of FIG. 1.

Collapsible bowl 140 preferably comprises interior volume 142 when in in-use condition 106. Collapsible bowl 140 is preferably un-folded when removed from fabric pouch 120 prior to use and expands thereby exposing interior volume 142 for in-use condition 106 to hold liquid (water) or solid (food). Interior volume 142 of collapsible bowl 140 is used to temporarily store a liquid, the liquid comprising water for animal 180. Interior volume 142 of collapsible bowl 140 is also usable to store food for animal 180. Collapsible bowl 140 preferably comprises flexible plastic. Upon reading this specification, it should be appreciated that, under appropriate circumstances, considering such issues as user preferences, design preference, structural requirements, marketing preferences, cost, available materials, technological advances, etc., other material arrangements such as, for example, flexible rubber, flexible soft metal, etc., may be sufficient.

Collapsible bowl 140 preferably comprises a plurality of wires 144 in certain embodiments. Plurality of wires 144 are preferably located vertically downward from top portion 146 of collapsible bowl 140 to bottom portion 150 of collapsible bowl 140. Plurality of wires 144 may run along bottom portion 150 of collapsible bowl 140 to provide structural support for collapsible bowl 140 when in in-use condition 106, yet allow it to collapse for storage (no-use). Wires 144 structurally maintain collapsible bowl 140 uprightly when interior volume 142 is exposed and collapsible bowl 140 is in in-use condition 106.

Figure 3:
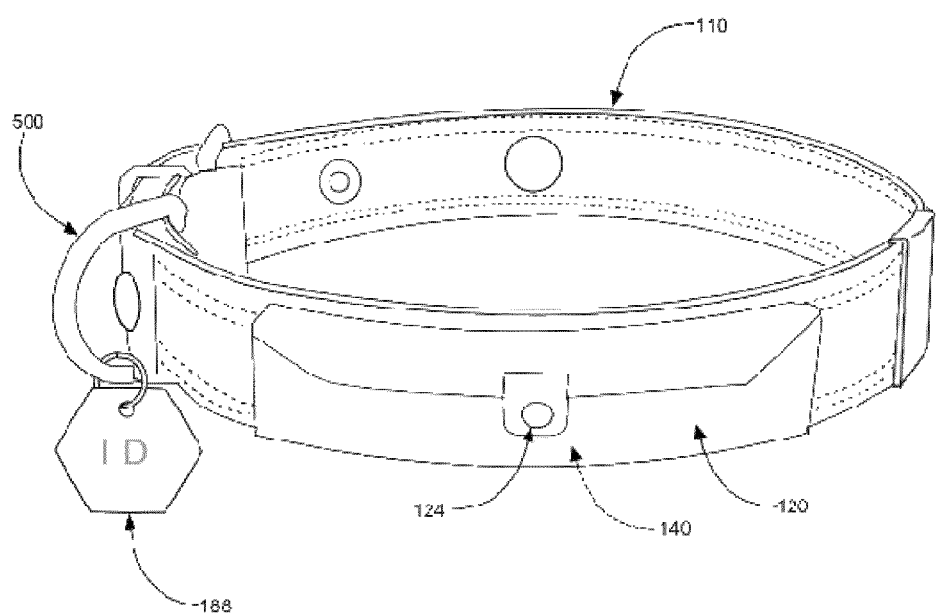
FIG. 3 is perspective view illustrating the fabric pouch having at least one fastener according to an embodiment of the present invention of FIG. 1.

Referring now to FIG. 3, illustrating fabric pouch 120 having at least one fastener 124 of animal collar system 100 according to an embodiment of the present invention of FIG. 1.

Fabric pouch 120 preferably comprises at least one fastener 124. Fastener 124 further comprises at least one button clasp. Upon reading this specification, it should be appreciated that, under appropriate circumstances, considering such issues as user preferences, design preference, structural requirements, marketing preferences, cost, available materials, technological advances, etc., other fastener arrangements such as, for example, hook and loop fasteners, clips, snaps, etc., may be sufficient.

Figure 4:
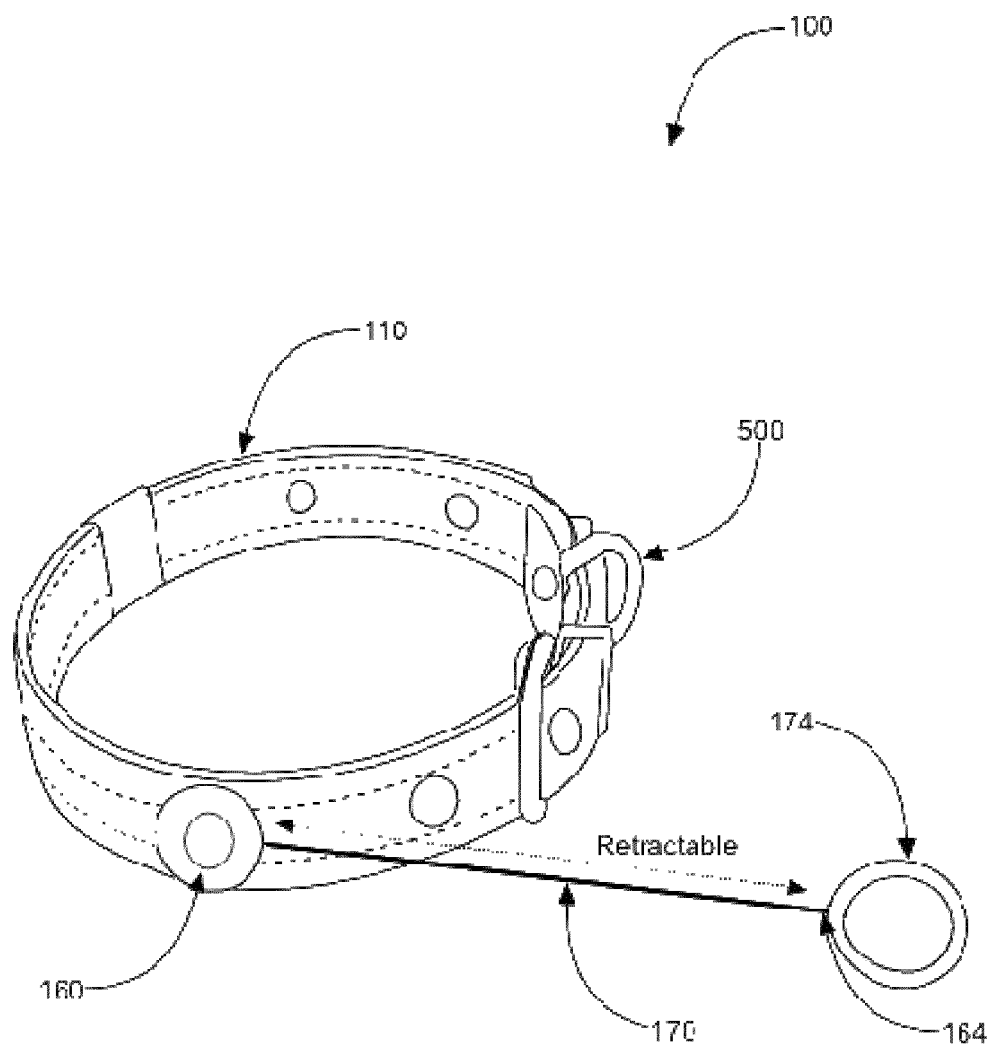
FIG. 4 is a perspective view illustrating a retractable leash having at least one circular ring located on an end of a circular housing unit of the animal collar system according to an embodiment of the present invention of FIG. 1.

Referring now to FIG. 4 showing a perspective view illustrating retractable leash 170 (non-retracted position) having at least one circular ring 174 located on end 164 of circular housing unit 160 of animal collar system 100.

Retractable leash 170 is coilable (may be retracted) inside circular-shaped housing unit 160 and is retractably-extendable to an approximate length of 8 to 10 feet when walking animal 180. Retractable leash 170, when switching from walking animal 180 to animal 180 resting, is spring-retractable back into circular-shaped housing unit 160. Retractable leash 170 may further comprises at least one circular ring 174 located on end 164 of circular housing unit 160 dimensioned to fit one to two fingers of walker 184 inside to grasp retractable leash 170.

Figure 5:
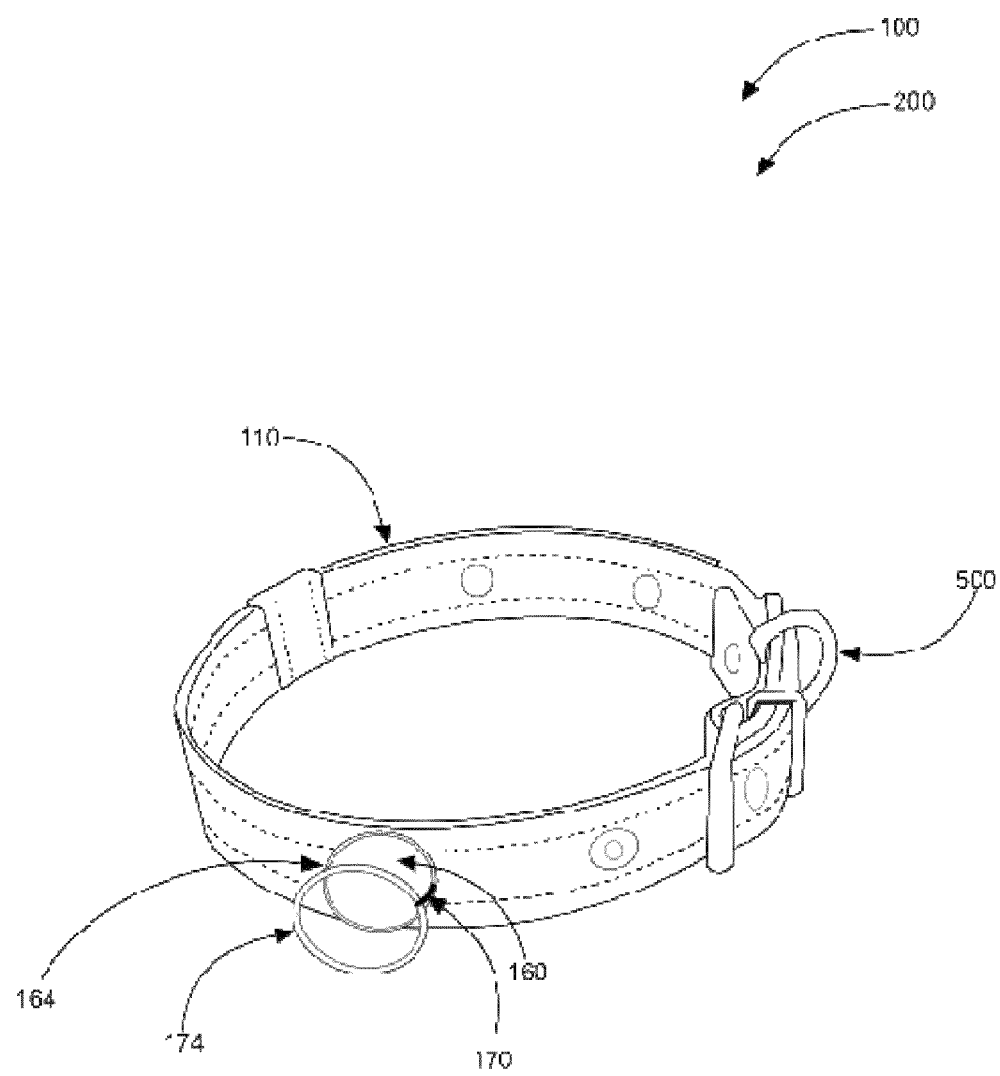
FIG. 5 is a perspective view illustrating a loop of the animal collar system according to an embodiment of the present invention of FIG. 1.

Referring now to FIG. 5, a perspective view illustrating loop 500 of animal collar system 100 (retracted position) according to an embodiment of the present invention of FIG. 1. Loop 500 is preferably located on animal collar 110 wherein walker 184 of animal 180 temporarily places identification tags 188 of animal 180.

Animal collar system 100 according to an embodiment of the present invention of FIGS. 1-4 may comprise kit 500. Kit 500 may comprise the following parts: plurality of animal collars 110 in various sizes and materials; a plurality of collapsible bowls 140; and a set of user instructions Animal collar system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 6:
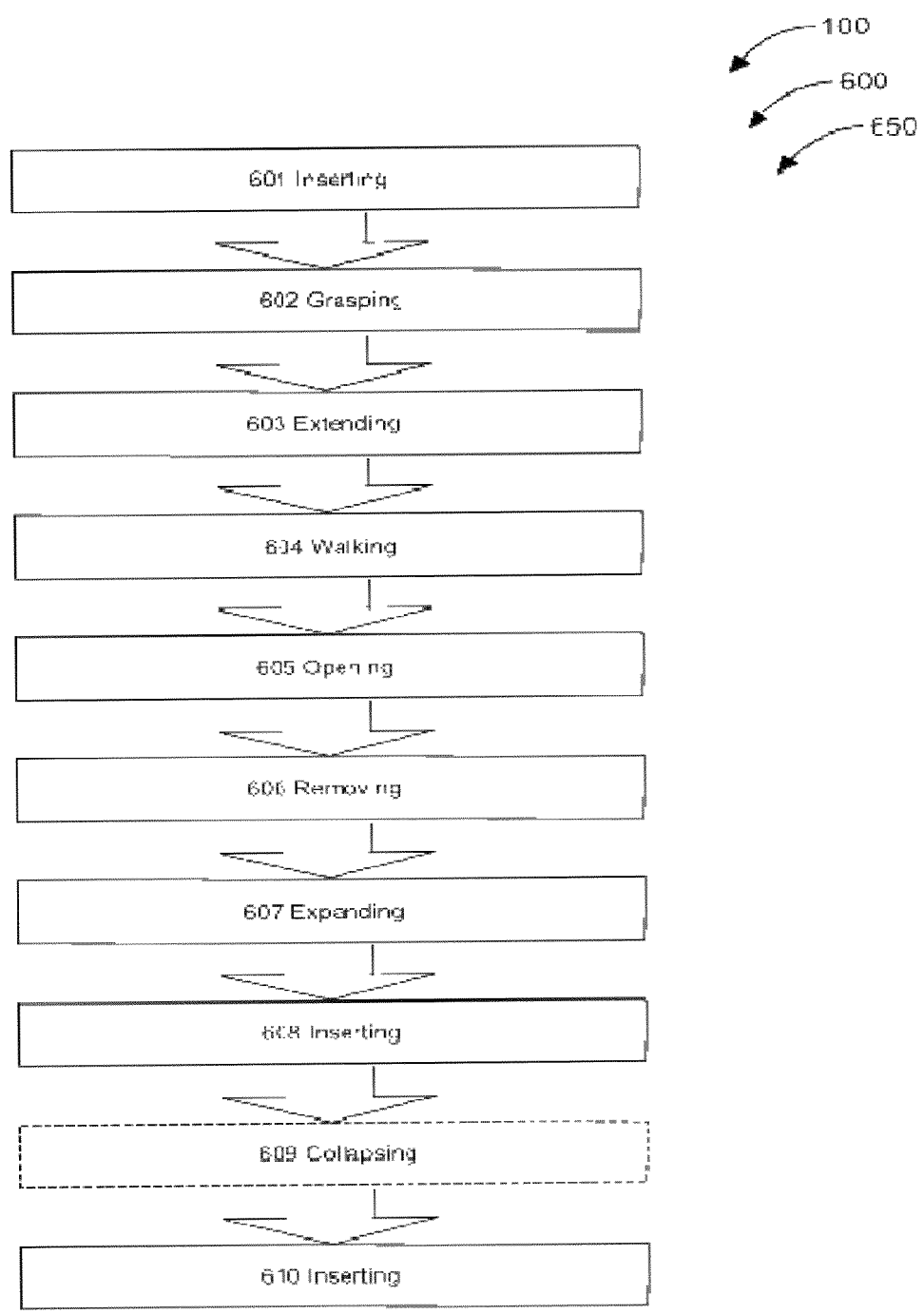
FIG. 6 is a flowchart illustrating a method of use for the animal collar system according to an embodiment of the present invention of FIGS. 1-5.

Referring now to FIG. 6, flowchart 650 illustrating a method of use 600 for animal collar system 100 according to an embodiment of the present invention of FIGS. 1-5.

Method of use 600 for animal collar system 100 preferably comprises the steps of: step one 601 inserting animal collar 110 onto neck 182 of animal 180; step two 602 grasping ring 174 located on end 164 of a retractable animal leash 170; step three 603 extending retractable leash 170 out of circular-shaped housing unit 160; step four 604 walking animal 180; step five 605 opening up fabric pouch 120; step six 606 removing collapsible bowl 140; step seven 607 expanding collapsible bowl 140; step eight 608 inserting water into collapsible bowl 140 for animal 180 to drink; step nine 609 collapsing collapsible bowl 140; and step ten 610 inserting collapsible bowl 140 back into fabric pouch 120 when animal 180 is finished drinking water.

It should be noted that step ten 610 is an optional step and may not be implemented in all cases. Optional steps of method 600 are illustrated using dotted lines in FIG. 6 so as to distinguish them from the other steps of method 600.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An animal collar system comprising:
   a) an animal collar including;
      i. a fabric pouch;
      ii. a flexible plastic collapsible bowl comprising a plurality of wires, said collapsible bowl removably housed in said fabric pouch; and
      iii. a circular-shaped housing unit located on said animal collar;
   b) wherein said fabric pouch is coupled to said animal collar;
   c) wherein said collapsible bowl is foldable into said fabric pouch when in a non-use condition;
   d) wherein said collapsible bowl comprises an interior volume when in an in-use condition;
   e) wherein said interior volume of said collapsible bowl is used to temporarily store a liquid, said liquid comprising water for said animal;
   f) wherein said collapsible bowl is un-folded when removed from said fabric pouch prior to use and expands thereby exposing said interior volume for said in-use condition;
   g) wherein said circular housing unit stores a retractable animal leash for use when walking an animal;
   h) wherein said plurality of wires are located vertically downward from a top portion of said collapsible bowl to a bottom portion of said collapsible bowl;
   i) wherein said plurality of wires run along said bottom portion of said collapsible bowl to provide structural support for said collapsible bowl when in said in-use condition;

j) wherein said plurality of wires structurally maintain said collapsible bowl uprightly when said interior volume is exposed and said collapsible bowl is in said in-use condition;

k) wherein said animal collar system controls relative movement of said animal in relation to said walker and also able to provide a convenient said collapsible bowl, usable when desired, allowing said walker to provide said animal with said liquid in a remote location; and l) wherein said collapsible bowl is structured and arranged to be removable, separate and apart from said animal collar so that said animal may still be maintained under control yet still able to drink.

2. The animal collar system of claim 1 wherein said interior volume of said collapsible bowl is used to temporarily store said liquid, said liquid comprising water for said animal.

3. The animal collar system of claim 1 wherein said interior volume of said collapsible bowl is also usable to store food for said animal.

4. The animal collar of claim 1 wherein said fabric pouch comprises at least one fastener.

5. The animal collar of claim 4 wherein said fastener comprises at least one button clasp.

6. The animal collar of claim 4 wherein said fastener comprises at least one hook and loop fastener.

7. The animal collar system of claim 6 wherein said circular housing unit comprises plastic.

8. The animal collar system of claim 7 wherein said retractable leash is coilable inside said circular plastic housing unit and is retractably-extendable to an approximate length of 8 to 10 feet when walking said animal.

9. The animal collar of claim 8 wherein said retractable leash, when switching from said walking said animal to said animal resting, is spring-retractable back into said circular housing unit.

10. The animal collar of claim 8 wherein said retractable leash further comprises at least one circular ring located on an end of said circular housing unit dimensioned to fit one to two fingers of said walker inside to grasp said retractable leash.

11. The animal collar system of claim 1 further comprises a loop located on said animal collar wherein said walker of said animal temporarily places identification tags of said animal.

12. An animal collar system comprising:
a) an animal collar including,
  i. a fabric pouch;
  ii. a flexible plastic collapsible bowl comprising a plurality of wires, said collapsible bowl removably housed in said fabric pouch;
  iii. a plastic circular-shaped housing unit located on said animal collar; and
  iv. a loop;
b) wherein said fabric pouch is coupled to said animal collar;

c) wherein said collapsible bowl is foldable into said fabric pouch when in a non-use condition;

d) wherein said collapsible bowl comprises an interior volume when in an in-use condition;

e) wherein said interior volume of said collapsible bowl is used to temporarily store a liquid, said liquid comprising water for said animal;

f) wherein said collapsible bowl is un-folded when removed from said fabric pouch prior to use and expands thereby exposing said interior volume for said in-use condition;

g) wherein said collapsible bowl comprises a plurality of wires;

h) wherein said plurality of wires are located vertically downward from a top portion of said collapsible bowl to a bottom portion of said collapsible bowl;

i) wherein said plurality of wires run along said bottom portion of said collapsible bowl to provide structural support for said collapsible bowl when in said in-use condition;

j) wherein said plurality of wires structurally maintain said collapsible bowl uprightly when said interior volume is exposed and said collapsible bowl is in said in-use condition;

k) wherein said fabric pouch comprises at least one fastener;

l) wherein said at least one fastener comprises at least one button clasp;

m) wherein said circular housing unit stores a retractable animal leash for use when walking an animal;

n) wherein said retractable leash is coilable inside said circular plastic housing unit and is retractably-extendable to an approximate length of 8 to 10 feet when walking said animal;

o) wherein said retractable leash, when switching from said walking said animal to said animal resting, is spring-retractable back into said circular housing unit;

p) wherein said retractable leash further comprises at least one circular ring located on an end of said circular housing unit dimensioned to fit one to two fingers of said walker inside to grasp said retractable leash;

q) wherein said loop is located on said animal collar wherein said walker of said animal temporarily places identification tags of said animal;

r) wherein said animal collar system controls relative movement of said animal in relation to said walker and also able to provide a convenient said collapsible bowl, usable when desired, allowing said walker to provide said animal with said liquid in a remote location; and s) wherein said collapsible bowl is structured and arranged to be removable, separate and apart from said animal collar so that said animal may still be maintained under control.

* * * * *